United States Patent [19]

Armstrong

[11] 4,119,273
[45] Oct. 10, 1978

[54] SYSTEM FOR POLLUTION SUPPRESSION

[75] Inventor: Edward T. Armstrong, Butler, N.J.

[73] Assignee: TII Corporation, Lindenhurst, N.Y.

[21] Appl. No.: 740,246

[22] Filed: Nov. 8, 1976

Related U.S. Application Data

[60] Division of Ser. No. 531,095, Dec. 9, 1974, Pat. No. 3,998,714, which is a continuation-in-part of Ser. No. 335,738, Apr. 30, 1973, Pat. No. 3,853,764, which is a continuation-in-part of Ser. No. 100,333, Dec. 21, 1970, Pat. No. 3,549,528, which is a continuation-in-part of Ser. No. 813,382, Pat. No. 3,730,881, Feb. 28, 1969, which is a continuation-in-part of Ser. No. 362,118, Apr. 23, 1964, abandoned.

[51] Int. Cl.$^2$ ............................................... B05B 3/06
[52] U.S. Cl. .................................... 239/254; 138/115; 210/273; 239/550
[58] Field of Search ............... 239/177, 254, 261, 264, 239/265, 550–552, 556, 567; 210/272, 273; 138/106, 107, 111, 115–117

[56] References Cited

U.S. PATENT DOCUMENTS

| | | | |
|---|---|---|---|
| 2,225,836 | 12/1940 | Lund | 239/254 |
| 2,263,125 | 11/1940 | Friend et al. | 239/254 |
| 2,266,223 | 12/1941 | Lund | 239/254 |
| 2,301,025 | 11/1942 | Friend et al. | 239/177 X |
| 2,601,430 | 6/1952 | Carter, Jr. | 239/254 |
| 2,611,646 | 9/1952 | Knowles | 239/264 X |
| 3,215,274 | 11/1965 | Schreiber | 239/254 X |

Primary Examiner—E. C. Blunk
Assistant Examiner—Andres Kashnikow
Attorney, Agent, or Firm—Oldham, Oldham, Hudak & Weber

[57] ABSTRACT

A rotary distributor arm comprising improved distribution nozzles and flow control accomplished by a gradual taper of the arm itself is defined which ensures a uniform flow distribution across the full radius of the distributing medium so that uniformity and optimum economy and efficiency are achieved with respect to the trickling filter itself because a uniform fluid flow is distributed across the entire top surface thereof.

5 Claims, 14 Drawing Figures

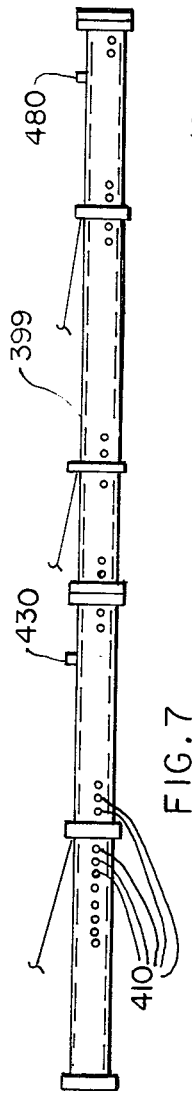
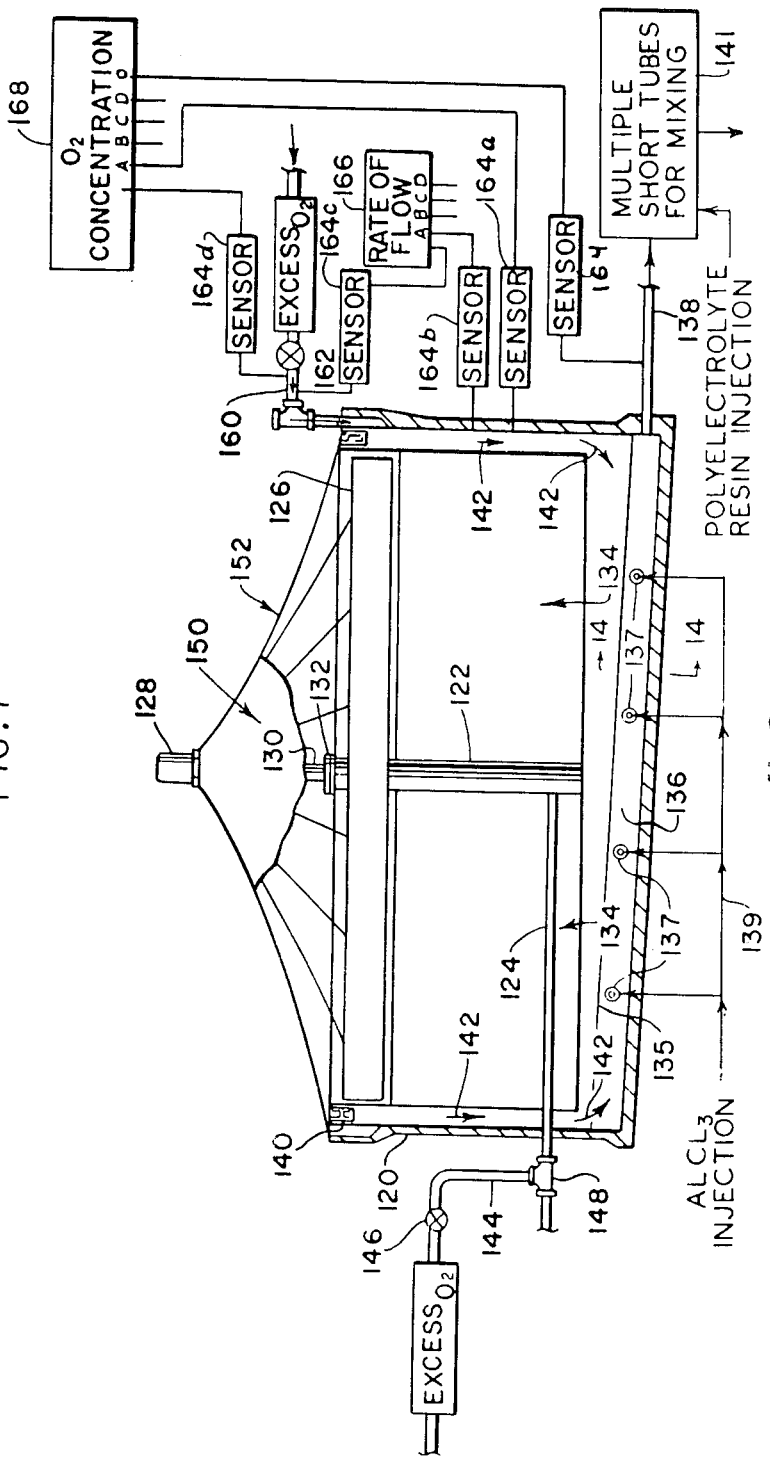

SYSTEM FOR POLLUTION SUPPRESSION

CROSS REFERENCE

This is a Division of application Ser. No. 531,095, filed Dec. 9, 1974, which is a continuation-in-part of a copending U.S. patent application bearing Ser. No. 355,738, "SYSTEM FOR POLLUTION SUPPRESSION", filed Apr. 30, 1973, now U.S. Pat. No. 3,853,764, which in turn is a continuation-in-part of an earlier application Ser. No. 100,333, filed Dec. 21, 1970, now U.S. Pat. No. 3,730,881, which in turn is a continuation-in-part of U.S. Pat. No. 3,549,528, issued Dec. 22, 1970, which in turn is a continuation-in-part of application Ser. No. 362,118, filed Apr. 23, 1964, and now abandoned.

This application is a division of my continuation-in-part patent application bearing Ser. No. 531,095, filed Dec. 9, 1974 now U.S. Pat. No. 3,998,714, which is a continuation-in-part of my co-pending U.S. patent application bearing Ser. No. 355,738, System for Pollution Suppression, filed Apr. 30, 1973, now in U.S. Pat. No. 3,853,764 which in turn is a continuation-in-part of my earlier application Ser. No. 100,333, filed Dec. 21, 1970, now U.S. Pat. No. 3,730,881, which in turn is a continuation-in-part of application Ser. No. 813,382, filed Feb. 28, 1969, now U.S. Pat. No. 3,549,528, issued Dec. 22, 1970, which in turn is a continuation-in-part of application Ser. No. 362,118, filed Apr. 23, 1964, and now abandoned.

BACKGROND OF THE INVENTION

The present invention relates to a rotary arm distributor apparatus wherein an equal amount of liquid is distributed for each unit area of an apparatus such as a trickling filter.

Heretofore, various rotary distributor arms have been utilized for distributing liquid over a bed. However, the amount of fluid per unit area regardless of location within the bed was not the same and generally varied with the radius of the distributing arm. Naturally, such a method of distribution did not result in the equal application of flow per unit area and, hence, in non-uniform treatment of the bed.

Heretofore, activated sludge aeration systems have been inefficient due to poor mixing and radial concentration gradients. Moreover, flow throughout the system has generally been uneven resulting in poor treatment.

The present invention relates to continuous treatment of a fluid by a chemical reaction. Heretofore, fluids were often treated in a batch system or in other apparatus wherein inefficient mixing or contact occurred.

The present invention relates to the self-enrichment of oxygen. Heretofore, oxygen was enriched by utilizing conventional techniques such as nitrogen absorption which generally was expensive and time-consuming.

SUMMARY OF THE INVENTION

It is an object of the present invention to provide a rotary arm distributor apparatus for distributing an equal amount of liquid per unit area.

For a better understanding of the invention reference should be had to the accompanying drawings wherein:

FIG. 2 is a cross-sectional, schematic view of an improved trickling filter comprising a stage of the system of the invention;

FIG. 7 is an elevational view of the remaining arm of FIG. 6.

Figure 1:
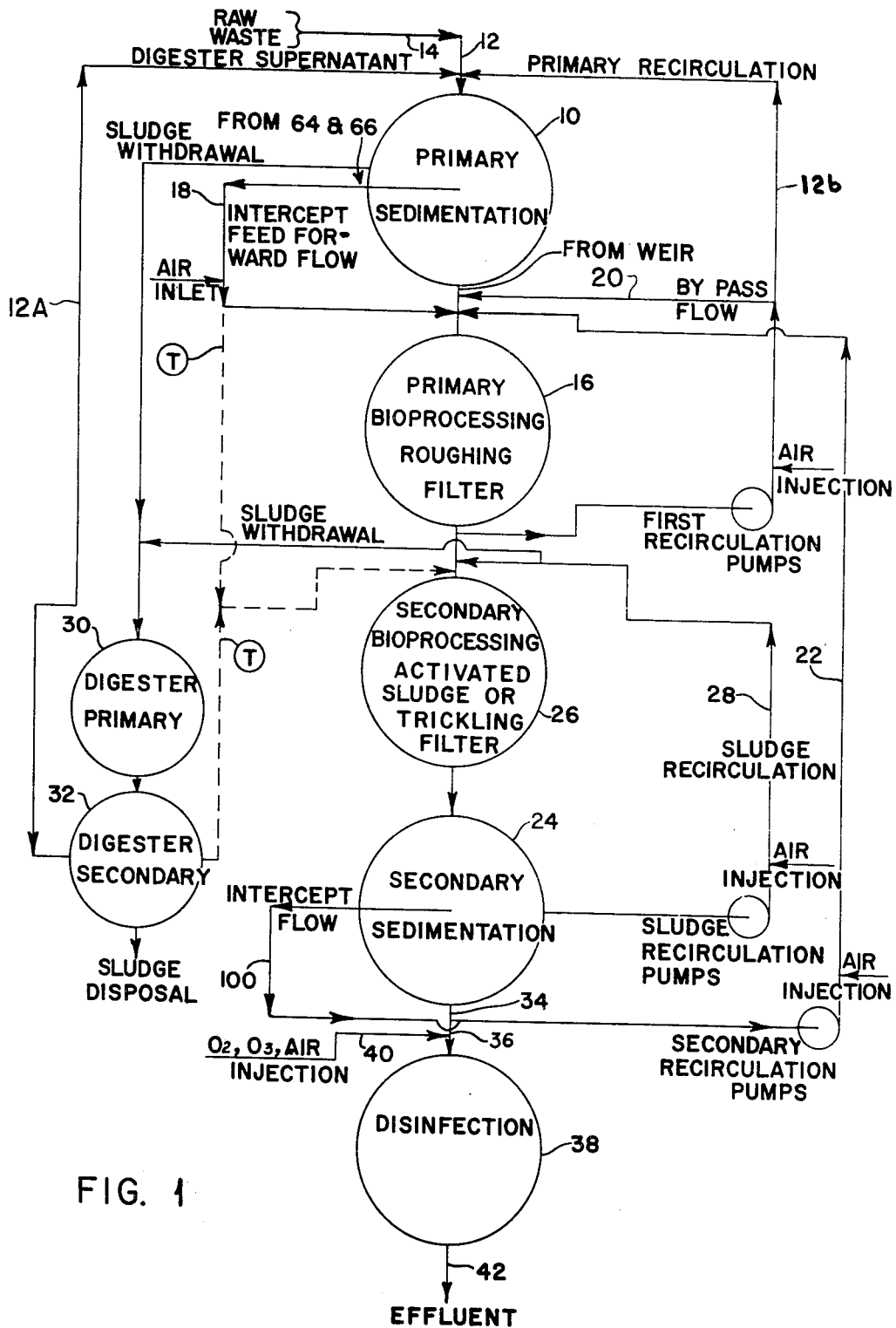
FIG. 1 is a block diagram, schematic illustration of the newly proposed system in total showing flow arrangements and the stages involved.
Figure 3:
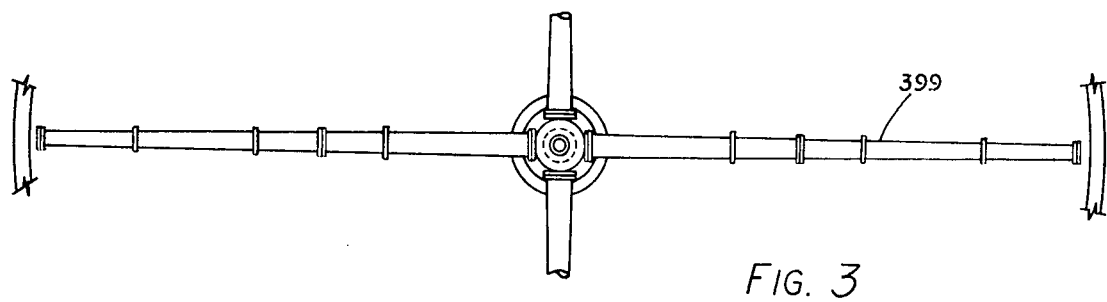
FIG. 3 is a plan view of a large diameter distribution arm and its rotating support post.

DEFINITION OF TERMS PSEUDOMONAS, ALCALIGENES, FLAVOBACTERIUM, MICROCOCCUS AND ENTEROBACTERIACEAE

ACTIVATED SLUDGE

All types of bacteria make up activated sludge, however, in usual operation obligate anaerobes will attenuate in number in response to the presence of air. A proteinaceous waste will favor alcaligenes, flavo bacterium and bacillus. A carbohydrate waste will proliferate pseudomonas as well.

ANAEROBIC DIGESTERS

The anaerobic digester bacteria include facultative and obligate anaerobes in active metabolism. Dormant aerobic forms may be present, such as spores of fungi. Acid formers are predominantly facultative forms although a few obligate anerobes have metabolic end products which are acid.

Methane formers are obligate anaerobes, methanobacterium, methanosarcina and methanococcus. In the matabolic pathway to subsequent end products where methane is a precursor, the pathway can be intersected owing to the implied vulnerability of methane formers to oxygen, oxygen-ozone or air. Thus, selective disinfection provides a means to inhibit methane formation or to deny a metabolic pathway to succeeding end products where methane is the necessary precursor. With denial of a pathway, an alternative pathway may be stimulated by changing environmental conditions such as by initiating as aerobic activity. In this way methane would not be formed. The source material, carbon dioxide would not be reduced. This is an unnecessary step in waste treatment, since carbon dioxide is a stable end product of aerobic treatment. The hydrogen involved would not be acted upon. It is probably a constituent of formic or acetic acid. Thus, the alternative metabolic pathway opened is that for aerobic microbiological decomposition of acetic acid. Instead of the anaerobic sequence of acetic acid; acetoacetic acid to acetic acid, isopropanol to butyric acid or butanol and unstable end products of high oxidative chemical this invention develops the aerobic sequence. It is: acetic acid, possible pyruvic acid, oxalacetate, citrate and the citric acid (Krebs) cycle to terminal oxidation.

In a similar way, the anaerobic reduction of sulfates by the obligate anaerobe, desulfovibrio can be inhibited. Shifting to an aerobic environment denies a pathway to hydrogen sulfide. It has been found that this is readily achieved practically by aeration. Consequences include a marked reduction in objectionable odor and long persistence of aerobic action. The latter case is demonstrable by unexpectedly deferred methylene blue stability tests indicating a delayed shift to products of anaerobic metabolism.

MICROORGANISMS IN WASTE TREATMENT

Trickling Filter

Filter microorganisms reflect the facultative nature of the filter. Predominant are bacteria; aerobic, facultative and anaerobic. Obligate aerobic spore formers, bacillus are easily found in the upper, aerobic plaques. The obligate anaerobe, desulfovibrio can be found in lower levels at the plaque-stone interface where, in usual practice, DO is zero. The majority of bacteria are facultative, living aerobically until DO zeros, then anaerobically.

With reference to the drawings, FIG. 1 illustrates the waste treatment equipment, process and overall system of unit operations in which the invention operates. A primary sedimentation tank is indicated by numeral 10. The tank 10 receives comminuted raw waste including settleable solids from a line 12 issuing from a main lin 14. A multiplicity of such lines 12 and subsequent operations may exist.

Two other flows are introduced from the operations which follow, constituting feedback of digester supernatant line 12a and of primary recirculation line 12b. The supernatant fraction is waste having high organic loading, relatively low flow rates, and it is resistant to aerobic processing for two reasons. First, it presents a biotal population adapted to anaerobic digestion and second, its organic composition includes the products of anaerobic metabolism.

The second fraction of flow is the primary recirculation usually occurring at rates in the range of one half to three times the raw waste rate. This recirculation flow is characterized by low organic loading and a high degree of treatability in an aerobic process. It exerts dilution effects on the raw waste which are not only marked, but which may be used in conjunction with secondary recirculation to great advantage in smoothing hydraulic and organic loading, as discussed later.

These three flows are impressed upon primary sedimentation. Regulatory authorities often stipulate hydraulic design criteria for sedimentation equipment in terms of the tank overflow rate which prevails for the composite flow. Such overflow rates may be affected by the technique illustrated in FIG. 1 of intercepting a portion of flow to be fed forward to bioprocessing indicated by numeral 16. As discussed later, in settling, using feed forward techniques, additional benefits accrue for example in organic load smoothing.

The basic flow from primary sedimentation 10 proceeds to a primary stage of bioprocessing 16. A roughing trickling filter is illustrative. There, to the sedimented basic flow, three component flows may be added. One 18 is the feed forward intercept flow noted previously. The second 20 is the bypassing fraction of primary recirculation. The third 22 is the secondary recirculation shown in FIG. 1. The existence of the feedback flows, the feedforward flow and the basic influent flow prior to bioprocessing is important. This combination provides sufficient degrees of freedom to enable independent regulation in this and succeeding operations of hydraulic and organic loading with some flexibility and without overloading primary sedimentation hydraulically. From the bioprocessing operation 16, such as the roughing filter shown, in most cases, existing plant flow proceeds to secondary sedimentation 24. In some instances, a second stage of bioprocessing 26 may be present. Usually this would be a finishing trickling filter. Rarely, but preferably, it would be an activated sludge stage of bioprocessing.

In this instance, as shown in FIG. 1, from the first stage of bioprocessing 16, the flow is split, with primary recirculation over line 12b withdrawing a fraction for feedback to an earlier stage of processing 10. The remaining fraction proceeds to the second stage of bioprocessing 26. Before introduction to bioprocessing 26, such as to the activated sludge operation, it may be mixed with recirculating activated sludge from line 28.

A remaining portion of the recirculating activated sludge is discharged for digestion with the primary sedimentation tank sludge in a primary digester 30 and secondary digester 32.

From the activated sludge operation 26, the flow proceeds to secondary sedimentation 24. The regulatory authorities stipulation on overflow rate again prevails; however, the permissible overflow rate for secondaries 24 may differ for those from primaries and may further depend upon the type of bioprocessing operation involved. The activated sludge operation is characterized by high rates of recirculation over line 22 of sedimented sludge as suggested in FIG. 1.

From the secondary sedimentation operation 24, flow may be intercepted for feedback recirculation over line 22 after partial sedimentation. A second fraction of fully sedimented flow may be returned in the basic secondary recirculation by line 34. The remaining fully sedimented flow proceeds to disinfection over line 36. In the disinfection unit 38 opertion, in-line gas-liquid disinfection over line 40 by injection may precede the conventional contact chamber disinfection. The technique of gas injection is more fully defined hereinafter. The same, or complementary disinfectants may be used. For example, in-line ozonation might be followed by contact chamber chlorination in unit 38. Alternatively, chlorination may occur in both stages or only in the contact chamber with no in-line disinfection. Disinfection yields the final effluent over line 42.

It has been shown in FIG. 1 that sludge is removed from waste at successive stages of waste treatment. The sludge is stabilized, usually in two-stage anaerobic digesters 30 and 32. From the digester 32, stabilized sludge may be discharged to drying on beds, in a kiln, fluidized bed reactor may be dewatered or on a vacuum dewtering drum. Ultimate disposition of solid products may be land fill or incineration. Disposition of digester supernatant or of concentrates or filtrates over line 12a has been noted previously. It is this overall framework of unit operations within which the concepts proposed by the invention must be implemented. Discussion will now proceed in terms of each of the unit operations described.

It should be noted however that aeration or other injections may take place at a considerable number of other points into the effluent in the system of FIG. 1. Specifically air may be injected into the digester supernatant recirculation, the raw waste input, the effluent from disinfection tank 38 and to the effluent from the secondary bioprocessing tank 26. In some instances it is desirable to inject a chlorine water solution into the effluent before disinfection to obtain break point chlorination. It should further be understood, of course, that chlorination may be used in the disinfection tank 38.

ROUGHING

Trickling Filter

The following discussion will involve the operation of the first bioprocessing stage, a roughing filter 36 commonly known as a trickling filter. No discussion will be given to the aeration stage 34 impressed upon the influent, as this is covered in my copending applications. Bioprocessing operations are responsible for the principal reduction in BOD. The elementary theory of a trickling filter is that an extending surface media is provided usually using rock fill, about 6 feet deep, on which a microbial plaque develops under pulsed film flow of waste liquor containing some dissolved oxygen, DO. The plaque is comprised of a media surface-contacting an anaerobic substrate immediately adjacent to which anaerobic and facultative microbiological forms predominate. Above this layer, aerobic forms may be present. This implies a source of oxygen. Ostensibly this is provided by an induced, vertical, natural-convective air circulation occurring parallel or countercurrent to the pulsed liquid flow.

A fundamental limitation of conventional trickling filtration is the indifferent oxygenation occurring therein. In consequence, aerobic processes essential to bioprocessing are inhibited. Diminished capacity in organic load reduction results. A further limitation aggravates this problem. It arises since, to allow some air circulation, hydraulic loading is restricted. This reduces the capacity of the filter and concurrently the effectiveness of waste treatment. This is so because the hydraulic compromise restricts recirculation flow to the filter, a prime factor in deriving significant BOD reduction.

To indicate the deficiencies of free convective air flow in trickling filters, it is of interest to refer to operating conditions inducing such flow. A basic equation for air velocity as taken from *Waste & Water Waste Engineering*, Fair, et al, John Wiley & Sons, Vol 2, pp 35–13, is:

V a = 0.135 ΔT − 0.46 where

V a is the air velocity in feet per minute and,

ΔT is the temperature difference between the air and the waste water, °F.

The waste water-air temperature difference seldom exceeds 25° F. For temperature differences of 10°, 3.4°, and −3.3° F, for example, V a is respectively +1.0, 0 and −1.0 fpm. The positive sign denotes downward flow. Recognizing the usual filter is a stone-packed bed about 6 feet deep, in no case is a realistic air velocity indicated. Forced air circulation has been examined with little promise. Packed bed resistance to air flow can be high, especially with superimposed hydraulic flows.

The limitations of aeration and compromises in hydraulic loading are unnecessary. The ideal remedy is use of an effective air-liquid mixing system in the trickling filter influent line. This will provide DO in the range of 7 to 8 ppm, all year round and at any hydraulic loading. The particularly undesirable restriction of recirculation may be relaxed. This simple remedy will enable hydraulic loading in the range from 1.000 to 3,000 or more gallons per square foot per day. Typical current practice is at about one-fifth to the lower range of these levels. The hydraulic flows are restricted to these levels to defer blocking of air flow which has been necessary to provide for aeration. Having eliminated compromises dictated by inadequacies of aeration in conventional art a simple change enables full exploitation of the revised trickling filter process. This change is one of media, from a size range of coarse rock to a reduction size range of smaller media. The change in media is primarily responsive to considerations of hydrodynamic flow. This is so because ccompromises relating to air flow are unnecessary. Inasmuch as the change is in hydrodynamic characteristics, it is conventional to describe the desired media properties in terms of hydrodynamic parameters.

The parameters of interest are the friction factor, the Reynolds number and the roughness coefficient. The media size factor applies as an equivalent diameter. The characteristic length of flow path is the bed depth, which is conventional. The relation among these factors is of the form:

$$f = (a/N_R) + b$$

where $f$ is the friction factor $a$ is a constant $N_R$ is the Reynolds number and $b$ is the bed media roughness factor.

The defining equations of interest are:

$$f = 2g \, De \, \rho/\mu/2, \text{ and}$$

$$N_R = De \, V \, \rho/\mu$$

It suffices to define the media in terms of its equivalent diameter and roughness factor. Flow conditions are stipulated by the functional relationship between friction factor, Reynolds number and bed depth.

The typical parameters for the new media are in the range tabulated next for a hydrodynamic element. This arises in relation to an influent waste with high DO and with no aeration required in the filter proper.

I have calculated parameters for a substitute plastic media, for example PVC. The media is extruded tubing. It is assembled in an equilateral triangular grid to maximize the surface installed per unit volume.

The tubes are spaced to ensure balanced flow inside the vertically positioned tubes and outside the tubes. This requires that the hydraulic radius for the internal and external passage be equal.

Figure 12:
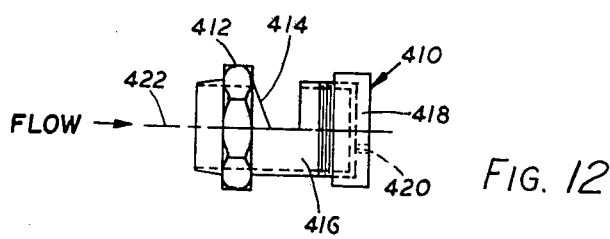
FIG. 12 is an enlarged elevational view of the diffusing nozzle utilized in the distributor arm of FIGS. 3–7.

A typical result appears as follows as is illustrated in FIG. 12

OD = 0.84 inch

ID = 0.74 inch

L = Grid spacing 1.16 inch

The hydraulic radius of a channel is: Area of section/perimeter

The section described above exhibits an area for biological plaques of about 40 ft²/ft³. Conventional rock has less than 40% of this specific surface..

The lengths may be full depth in a continuous section, from 6' to 30'; however, shorter lengths stacked to the total depth have advantages. The basic advantage is that the laminar boundary layer of liquid on the plaque starts at zero thickness and builds up. A length which is short compared to the length required to fully develop a stable laminar boundary layer keeps the dissolved oxygen supply to the plaque readily available. The diffusion gradient is increased in two ways. First the concentration is sustained at high levels, second the boundary layer thickness is decreased.

The length for a fully developed boundary layer in laminar flow is as great as 20 feet for water flowing in tubes of about ¾ inch diameter in the limiting transitional range of Reynolds number, about 3,000. Expressing distance in terms of diameter, the transition length is about 1/10 to 1/20 the Reynolds number.

The flow in the spaced tubular media at the limiting laminar Reynolds number may be estimated. It is 22 million gallons/day per 1000 square feet of media surface. Hydraulic loading rates are conventionally less than 1 million gallons/day per 1000 square feet. Thus, planned high hydraulic loading is feasible with this media.

Moreover, the uncompromised rates enable much higher organic loading. Instead of present upper limits of less than 70 pounds of BOD per day on each thousand cubic feet of media, three to four times this load appears feasible. The high organic or nitrogenous loading only becomes practicable with preaeration which permits much higher hydraulic loading. All three variables, DO, hydraulic loading and organic loading, interact. Because of this, only a mutually compatible solution is feasible. In this instance the equipment and method involved bring into action the integrated benefit of efficient gas-liquid exchange and bioprocessing operatios.

The structural details of the improved trickling filter utilizing a mdia 134 described hereinbefore are illustrated in FIG. 2 of the drawings which shows that a circularly-shaped housing 120 centrally mounts a carrying post 122 which receives the liquid effluent through pipe 124 carrying the aerated effluent discharge from the settling tanks. The post 122 rotatably carries a distributor arm 126 which is rotatably driven hydraulically by reaction or by a motor 128 connected thereto through shaft 130 and double flanged coupling 132. The liquid influent through pipe 124 passes up through center post 122 and actually distributes in a sprinkled relationship out the distributor arm as it is rotated by motor 128, all in substantially the conventional manner heretofore utilized in trickling filters.

In the particular construction utilized, some type of wire mesh reinforced concrete wall or the like to form a large circular bed indicated generally by numeral 134 is filled with loosely packed stones or the specialized materials defined above that offer promise of providing greater surface areas per unit volume. As long as the problems of constrained liquid flow and undue gas-phase flow restrictions are considered, extended surface packing can be used effectively in this configuration. In any event, the liquid sent out by distributor arm 126 drips down through the packed beds 134 into the open base.

In addition, the invention may contemplate utilizing a plurality of forced air blowers, each indicated generally by numeral 140 positioned around the periphery of the tank 120 and adapted to drive air in the direction indicated by the arrows 142. Since one of the purposes of such a trickling filter to reduce BOD is to ensure more oxygen is present to cause oxidation of the liquid effluent, such forced air which must necessarily pass up through the bed in a reverse flow to the liquid flow therethrough, forced circulation can supply oxygen to sustain aerobic metabolism. Further, in order to provide the increased oxygen recovered may be atmosphere, excess oxygen actually injected through air injecting-mixing element for fluid-fluid as described herein into the effluent through pipe 144 into some type of turbulent mixing chamber 148, as approximately controlled through valve 146. Also, in order to make the filter operate on nearly 100% humidity in the atmosphere, some type of roof covering indicated generally by numeral 150 may be provided that is supported by a catenary cable arrangement 152. Hence, the trickling filter may utilize 100% relative humidity, forced air circulation, and an oxygen-encircled atmosphere because of the oxygen injection into the effluent. The increase in plant capacity and reduction in BOD is readily measurable with this setup.

In this aerobic process it is also apparent that the design features described for improved sedimentation means may enhance the waste treatment system overall. In other words, oxygen injection into the sludge recirculation unit 22 is contemplated so as to greatly enhance the operating capabilities of that unit to produce treatable safe sludge concentrations.

The invention might also incorporate the addition of excess oxygen directly into the humidified atmosphere through a pipe 160 as controlled by valve 162. The control of the amount of oxygen entering might appropriately be provided by a suitable sensor 164 associated with the effluent output pipe 138 and operating in conjunction with a rate of flow instrument indicated by block 166, and an oxygen cconcentration unit indicateed by block 168. Appropriate sensors 164a-d are associated with the rate of flow instrument 166 and oxygen concentration unit 168 to complete this setup, so as to control the actual amount of oxygen flow through pipe 160 for the most economical operation of the system.

BIOPROCESSING SECOND STAGE ACTIVATED SLUDGE

An activated sludge operation may be the sole bioprocessing unit or a secondary element in a two-stage bioprocessing operation. It is unlikely to find activated sludge as the initial element of a two-stage bioprocessing operation. This is in recognition of the sensitivity of activated sludge operations to fluctuating influent hydraulic or organic loads. Although not present typical practice, activated sludge operations may be adapted to handle fluctuating hydraulic and organic plant influent loads. This may be done by providing sufficient flexibility in circulation to accommodate independent balancing of hydraulic and organic load incident upon the activated sludge operation. This has been referred to before and will be discussed under system integration.

Regardless of the mode of application of the activated sludge operation, a predictable requirement exists for aeration. Observed acration corresponds to from 500 to 700 cubic feet of air per pound of BOD removed.

The implied oxygen requirement is from 7.5 to 10.5 pounds of oxygen per pound of BOD removed. An equivalent quantity may be derived from surface aeration. Thus, the overall conventional requirement for oxygen is from 15 to 21 pounds of oxygen per pound of BOD removed. Recalling that BOD equates one to one with oxygen demand by definition, the implication is that oxygenation by aeration using conventional techniques is not remarkable for efficiency. This inference remains valid even allowing for available internal sources of oxygen as from the biological reduction of nitrates. This finding is to be expected since aeration efficiencies are often quoted in the range of 2% to 10%. It should be understood that the quoted values pertain to aeration of liquid having an initial DO of zero. This yields the highest possible efficiency. A more realistic efficiency is that for a DO in the range of 2 ppm.

The practical solution to the aeration question in activated sludge operations is set forth in my copending application identified above and hereinafter. The technique and equipment derives oxygen mixing efficiencies considerably in excess of 50%. Use of such aeration means in the present activated sludge operation is visualized. This will reduce air compressor capacity required by as much as an order of magnitude and will cut drive power requirements to less than ½ usual values. The treatment method may be any of the seven basic methods utilized in activated sludge operations. What is important is the integration of efficient gas-liquid mixing techniques with this stage of bioprocessing.

From the activated sludge operation, treated waste discharges to secondary sedimentation. Where the activated sludge operation is not preceded by sedimentation the following sedimentation operation might properly be termed final sedimentation.

ROTARY DISTRIBUTOR ARM AND NOZZLE FOR TRICKLING FILTER

In a trickling filter, the bed beneath the distributor arm should be dosed with liquid at a uniform flow over its area, expressed in gallons per square foot per day. A usual maximum rate is 1,000 gallons per square foot per day. It is necessary for efficiency and economy of operation that the dose rate be uniform with radius at any impressed total flow on the system. The reason for this is that at any impressed flow rate, the flow from the distributor must dose the trickling filter media with equal quantities of flow per square foot of surface. Since the surface of the filter goes up as the square of the radius it is understandable that the flow is going to have to go up quite a bit at the outside edge. Unless some provision is made for channeling the flow, the tendency in an actual operating filter is to make the flow distribution speed dependent. This will tend to unwater the central section of the arms and to shift major flow towards the outer radii of the distributor arm. It is particularly a problem to ensure uniform flow at high flow rates.

Figure 4:
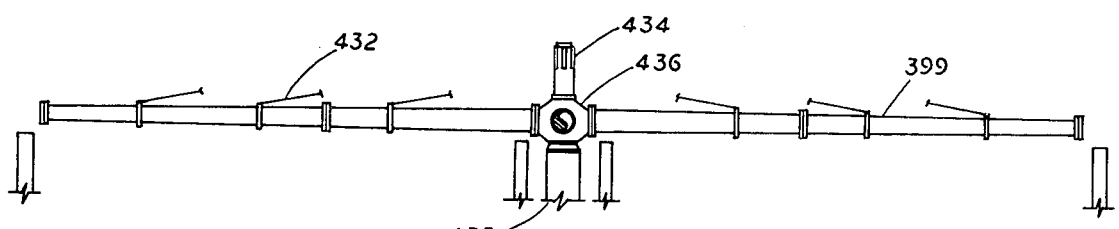
FIG. 4 is a front elevational view of the distribution arm of FIG. 3.
Figure 5:
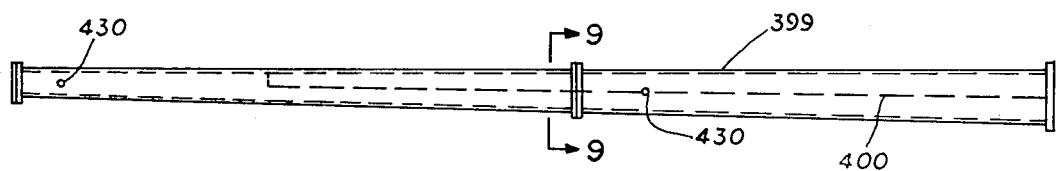
FIG. 5 is a plan view of the arm alone indicating some of the internal structure in dotted lines.
Figure 9:
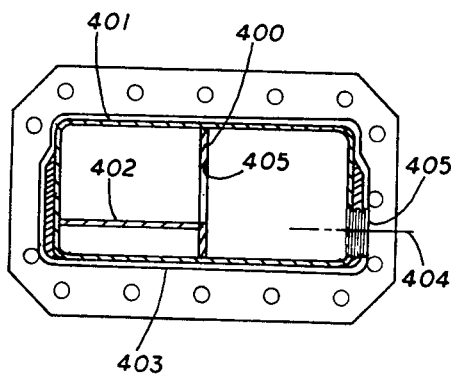
FIG. 9 is an enlarged cross-sectional view taken on line 9—9 of FIG. 5.

Now referring particularly to FIGS. 3-7 of the drawings, the distributor arm is indicated by numeral 399. A dotted line 400, as seen in FIG. 5 runs down the centerline of arm 399, and this represents a closure which isolates a channel allowing only half the total channel to be available for the flow in the filter distribution arm for a lower portion of the section. FIG. 9 better shows the cross-sectional configuration, and clearly indicates the divider section 400, as well as a horizontal divider section 402 which will be discussed in further detail hereinafter. Note in FIG. 9 that the upper surface of divider 402 is at substantially the same level as the centerline 404 of the orifice opening 405 (orifice 410 not shown in FIG. 9). The orifice locations are present in the maximum number for which space is available and they allow effluent to be removed from the distributor arm.

Now with reference to FIG. 9, the construction is provided to isolate the flow of effluent until the level builds up to the top surface of divider 402. First in considering this building of level, it must be assumed that flow occurs at a variable rate as it is distributed by the distributor arm. This flow rate depends on the rotative speed of the distributor arm. A usual maximum rate is 1,000 gallons per square foot per day. However, by doubling the width of the channel above the divider 402, what has been achieved is in effect allowing a further increase in flow to occur with a reduced change in level on the discharge orifice. This reduces the range in one variable. Other means that may be used to vary the distribution rate are to vary independently the diffusing nozzle to improve control of thrust, speed of rotation and diffuser flow such that the dose rate is uniform with the radius at any impressed total flow. Hence, unless some provision is made for channeling the flow, the tendency in an actual operation filter is to make the flow distribution speed dependent. Therefore, I have found that by blocking off the lower part of the section by divider 402, the flow at low rate is ensured and it reduces the effect on speed of increased flow at high rates by accommodating it with a smaller change in head on the diffuser nozzles in either set.

Figure 6:
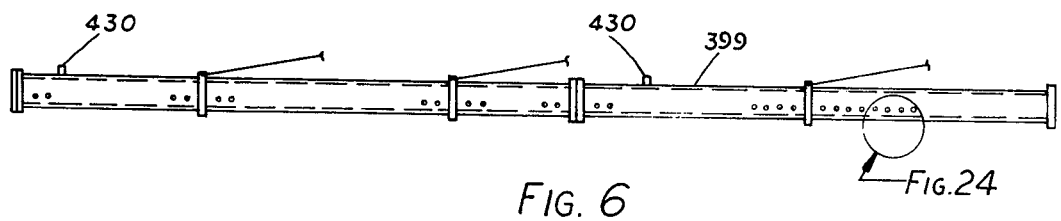
FIG. 6 is an elevational view of the arm of FIG. 5.
Figure 8:
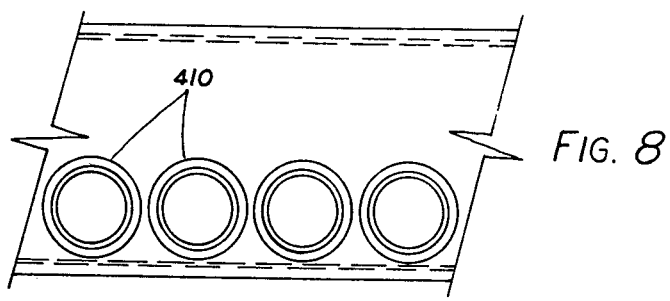
FIG. 8 is a broken away enlarged view of the nozzle arrangement taken from the circled area of FIG. 6.

An additional feature of the distributor arm 399 which is interesting is that its diffusing orifices indicated generally by numerals 410 and shown in FIG. 8 are positioned at various locations along the length of the distribution arm in FIGS. 5, 6 and 7 are variable in elevation. That is, the flow passage elevation can be modified by rotating the orifice. In this way, depending on orifice configuration, rotation may be used to vary the head and flow or momentum change. The momentum change develops thrust. This effects distributor speed. Speed affects the head along the distributor radius. Thus, it is important to be able to change head, flow and momentum changes in an orifice independently, and the orifices 410 as seen in FIG. 12 incorporate a hex nut 412 to allow the orifices to be mechanically rotated to vary the direction of their thrust.

Figure 13:
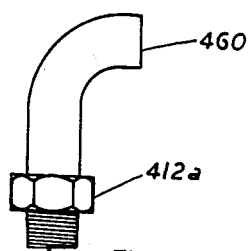
FIG. 13 is a side elevational view of an alternative sweep elbow that might replace the diffusing nozzle of FIG. 12.
Figure 14:
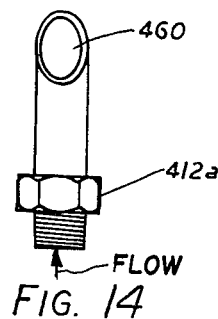
FIG. 14 is an end elevational of the sweep elbow of FIG. 13 indicating a flattened end outboard.

FIGS. 13 and 14 represent a modified orifice comprising a 90° elbow. This may again be rotated by means of the hex nut 412 either using a wrench or hand pressure. It may be rotated to discharge vertically upward or downward. The head and flow would thereby be varied greatly. The change in momentum would be a function of the velocity of the liquid, as well as the angular position of the orifice.

Again referring to FIG. 12, each nozzle 410 incorporates a slot 414 milled into a circular pipe section 416 comprising the nozzle. Further, a rotatable end cap 418 has a slot 420 cut therein so that in effect two separate slots for control puposes are available. Preferably the slot 420 is elongated and circular on the ends but as it can be seen it is eccentrically offset from the centerline 422. Thus by rotating the slot 414 upwardly, the flow is reduced because the head is reduced. In this instance as shown in FIG. 8 there may be more flow coming out the slot 420, but none coming out of the slot 414. Now again looking at the slot 414, if this is rotated down, then the slot 420 in the end of the cap will be rotated up so that there is no flow directly out the end of the cap, but all or substantially all of the flow drops down onto the filter bed from the slot 414 in the short nipple section of the nozzle. Considering the desire to change independently the relative flow and the propulsive effort at the same time, this is possible by mutual changes in the angular settings of the two rotatable elements, namely cap 418 and nut 412 and pipe section 416 which comprise the nozzle 410.

The rotation of the nozzle elements can be done manually, but most conveniently it can be done using an appropriate wrench. Primarily the idea of adjusting the angular position of the slots for flow control is to accommodate changes in flow which occur progressively on a plant, usually towards an increasing flow, which would occur over a long period of time, rather than daily incremental changes without affecting the radial uniformity of dose to the filter bed.

It must also be understood that the speed of the distributor arm is important in that the distributor rotates by reason of propulsive effort. As the speed changes, an effect on the pressure distribution in the distributor arm occurs. This is apparent from the fact that the liquid surface in a rotating vessel is paraboloidal. Thus, the virtual head approaching the distal tip of the distributor is higher than that at the center by the difference in magnitude of the paraboloidal ordinates. The general effect of the increased head towards the distal tip of the arms would be to increase the flow dispoportionately in that region. This is one reason why measures were taken with respect to the nozzle slots to control this rotative speed of the distributor, and also the measures to control the flow channel as seen in FIG. 9, which was discussed above. Therefore, this distributor in the embodiment shown in these drawings will accommodate with independent means and provide the adjustment necessary to achieve the basic objectives of making uniform over the flow range and distributor radius the proper flow distribution per unit area of receiving media below the arm.

As a further result the rotatable cap 418 facilitates cleaning of material which may become entrained in the orifices or slots 414 and 420. It should be noted with respect to FIG. 8 that the nozzles 410 are actually placed in the closest possible spacing such that the number of slots or orifices which are inserted into an arm may be maximized.

A further point that should be noted with respect to FIGS. 3-7 is that the nozzles appear on the upstream face of the distributor arm as well as on the downstream face, and this is seen in FIGS. 5, 6 and 7. The purpose of the upstream orifices or nozzles is to enable further control over the propulsive effort and the speed which is developed in the distributor without compromising the uniformity of flow dosage per unit area of receiving media beneath the filter.

Anothe possibility with the type of distributor arm defined above is to insert instead of spary head nozzles such as shown in FIG. 12, some type of closure plug which in this way adjusts the flow independently of the orifices. That is, by removing nozzles and placing in a substitute blanking nozzle, which is a standard pipe plug, in this case, the flow can be controlled. A further detail in the construction of the distributor is a vent to prevent the formation of a vacuum. Such vents 430 are shown in FIGS. 5, 6 and 7.

A further feature of the structural requirements of the arm is to have tie rods indicated generally by the numeral 432 and best seen in FIGS. 4, 6, and 7 extending from various points along the length of the arms back to the central support post 434 to support the arms in cantilevered fashion from the central distributing head 436. Such tie rods 432 compensate for horizontal forces which occur by reason of an acceleration or deceleration, and the structure of the arms themselves is that they function as a variable section-modulus continuous beam from zero radius to the radius of the distal tip so that they are supported at independent points by the rods 432 which are adjustable so that the distributor may be trimmed when it is installed to operate in a horizontal plane with much lower stress than would occur with a cantilevered arm.

The multiplicity of tie rods and the stress analysis of such a distributor is based on approximations concerning indeterminate structures involving a continuous beam supported on three intermediate supports. It can be utilized analytically at least as a first approximation, as a constant section beam. Subsequently the analysis needs to be refined for checking. It should be strongly pointed out and is clear from the drawings that the section-modulus varies continuously along the length of these arms from a larger cross-sectional configuration near to the hub 436 to a much smaller cross-sectional configuration at the distal tip, and hence the section-modulus and the stress analysis needs to be made more sophisticated to accomodate the variation in section-modulus as a function of radius of the distributor. In other words it is a feature of the invention that the arms are tapered or decrease in cross-sectional area all the way along the whole length uniformly. The tapered configuration to the arms makes them less sensitive to changes in rotative speed of the distributor and to short term changes in distributor flow, and by constriction of the channel, suppreses the effect of getting a greater volume flow out the nozzles the further they are away from the center of the hub owing to speed effects.

Now again referring to the cross-sectional configuration of the arm which is substantially rectangular in section as seen in FIG. 9, the divider web 400 furthermore serves as a reinforcement between the upper and lower flanges 401 and 403 of the distributor arm which functions as a stiffening beam shear web. Note that the web 400 is interrupted periodically with holes through it such as at 405. These holes 405 allow fluid to enter into the upper channel of the blocked off section as well as in the normal channel.

Figure 10:
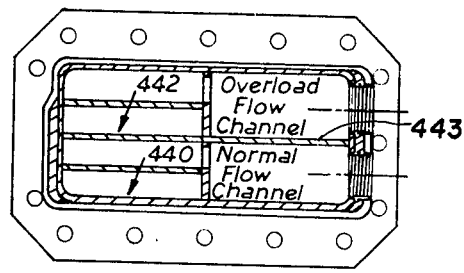
FIG. 10 is a modified double flow channel similar to that shown in cross-sectional configuration of FIG. 9.

Now referring particularly to FIG. 10, this represents the same cross-sectional configuration of FIG. 9 except substantially doubled in heighth with the blocked off regions 440 and 442 blocked in both the upper and lower channels. The upper channel (overload flow channel) is separated from the lower channel (normal flow channel) by a horizontal divider 443. The intention here is to have the upper section function under high conditions of plant flow and ensure the proper distribution of flow along the radius of the distributor regardless of the level of flow. However, in order to ensure proper distribution of flow along the radius of the distributor regardless of level of the flow, the flow through the overflow channel must not be a flow rate which would cause the trickling filter distributor arm to rotate in an excessively fast manner and thereby not deposit and equal amount of liquid upon any unit area regardless of location along the radius of the distributor arm. High speed would throw the liquid out to the outside radii of the distributor making the flow distribution through the media not a constant per unit of surface area exposed. With the embodiments shown in FIG. 10, however, this distributor section would maintain approximately the same width or heighth ratio in the cross-section as in FIG. 9 for the normal distributor. In other words, the heighth and width ratio would be the same in the double channel distributor arm as in the single channel.

Figure 11:
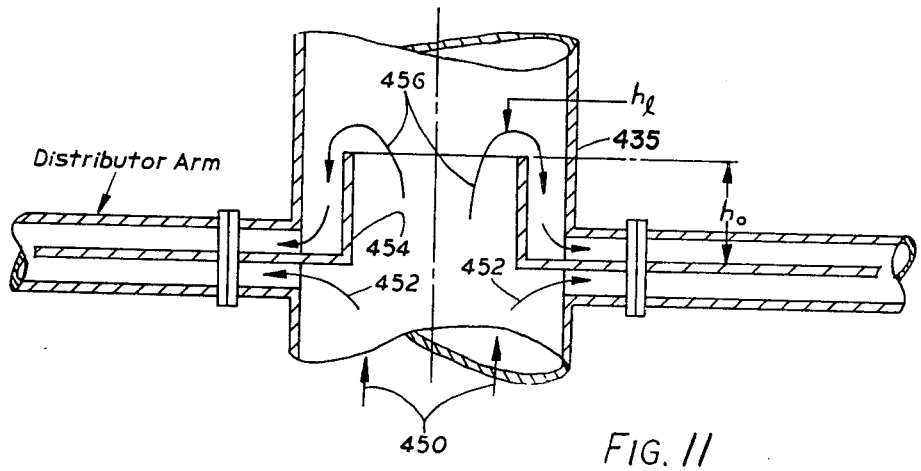
FIG. 11 is an enlarged cross-sectional view to show the flow path in the distribution head to define the double flow channel of FIG. 10.

In order to understand how the double channel or overload flow configuration of FIG. 10 would work, reference should be made to FIG. 11 where the numeral 435 represents the central column of the trickling filter with flow coming in as indicated by the arrow 450. The normal flow for the effluent will be directly into the normal flow channel of the distributor arm or as indicated by arrow 452. However, when the flow builds up over the weir type pipe section 454 overflow will occur in the direction of the arrow 456, and thence down into the overload flow channel of the distributor arm as clearly shown in FIG. 11. The weir equation that is pertinent is $$\frac{Q}{cfs} = 3.33 \times \underset{ft.}{c} \times H\ 3/2\ ft.$$

The sketch of the diagram of FIG. 11 indicates $h_0$ which is the weir head elevation of the weir with no flow over it. Basically the above equation gives the weir flow which would be accommodated in the upper channel when the flow overflows the overflow weir. The flow then in the lower channel or the normal flow channel would then increase less at any level of flow beyond that cutoff for the particular head $h_0$. After the head $h_0$ is reached, the overflow of the weir would pass into the upper or overflow channel in quantities or at flow rates as given by the equation. The head on the weir would be the actual head of water level of the edge of the wier which is marked on FIG. 11 as $h_1$ meaning the head of the liquid, in feet.

Hence, in summary, for a given influent head, the flow in the rotating distributor arm is governed by general things. These are the nozzles that are present such as the nozzle position, the number of active nozzles, the number of retro nozzles, and the rotative speed of the distributor.

Referring again to the alternate sweep elbow of FIGS. 13 and 14, the distance 0 in FIG. 13 represents the displacement of the end of the nozzle from the centerline of input to indicate that rotation of the nozzle will change the head. It should also be seen as shown in FIG. 14 that the end of the nozzle at 460 is flattened to spread the flow of fluid upon discharge from the nozzle to accomplish an overlap in the falling streams of adjacent nozzles.

What is claimed is:

1. A rotary distributor arm apparatus for a sewage treatment system to be used in conjunction with influent to a trickling filter, comprising;
   a rotatable central distribution head to receive the influent,
   an elongated post extending from the top of said head,
   at least two elongated distributor arms connected to and extending substantially horizontally from said head in symmetrical balanced relation thereto, each arm defining a constantly variable section modulus as a function of the radius of said arms, a plurality of tie rods extending from various points along the length of each arm and connected to said post to support said arms in a horizontal plane,
   nozzle means along the length of each arm for discharging said influent,
   said arms being substantially rectangular in cross section with the longer sides being horizontal, said nozzle means located in the shorter vertical sides, and
   a center vertical stiffener web located between said longer sides to provide two channels, said web having holes therethrough to allow influent flow between channels and a false bottom in one of the channels so the flow path thereof is vertically above the other channel.

2. Apparatus according to claim 1 wherein said nozzle means in the one channel are located adjacent the false bottom and are positioned on the normally leading side of the arm, and said nozzle means in the other channel are located adjacent the bottom side and are positioned on the normally trailing side of the arm.

3. Apparatus according to claim 2 wherein said nozzle means incorporate at least two influent discharge openings, and means for independently varying the height of each said opening with respect to the flow path of said arm.

4. Apparatus according to claim 3 wherein said nozzle means comprise a rotatably received pipe section having a notch in one side, and a rotatable closure for the end of said pipe section having an eccentrically positioned slot therein.

5. Apparatus according to claim 3 wherein said nozzle means comprise a pipe section having substantially a 90° elbow and the end of said section is opened, but having an elliptical diffuser configuration designed to overlap spray from adjacent nozzle means.

* * * * *